(12) United States Patent
Dong et al.

(10) Patent No.: US 11,300,789 B2
(45) Date of Patent: Apr. 12, 2022

(54) AUGMENTED REALITY GLASSES

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Ruijun Dong, Beijing (CN); Hao Zhang, Beijing (CN); Lili Chen, Beijing (CN); Chenru Wang, Beijing (CN); Xuebing Zhang, Beijing (CN); Yali Liu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 539 days.

(21) Appl. No.: 16/328,411

(22) PCT Filed: Sep. 7, 2018

(86) PCT No.: PCT/CN2018/104498
§ 371 (c)(1),
(2) Date: Feb. 26, 2019

(87) PCT Pub. No.: WO2019/134384
PCT Pub. Date: Jul. 11, 2019

(65) Prior Publication Data
US 2021/0341738 A1 Nov. 4, 2021

(30) Foreign Application Priority Data

Jan. 2, 2018 (CN) .......................... 201810001591.2
Jun. 14, 2018 (CN) .......................... 201810619928.6

(51) Int. Cl.
*G02B 27/01* (2006.01)
*G02B 27/28* (2006.01)

(52) U.S. Cl.
CPC ....... *G02B 27/0172* (2013.01); *G02B 27/283* (2013.01); *G02B 2027/0178* (2013.01)

(58) Field of Classification Search
CPC .......................... G02B 27/01; G02B 27/0101; G02B 27/0138; G02B 27/141; G02B 27/0172;
(Continued)

(56) References Cited

U.S. PATENT DOCUMENTS 6,091,546 A * 7/2000 Spitzer ................. G02B 27/017
359/618
9,632,312 B1 * 4/2017 Cakmakci ............ G02B 5/1852
(Continued)

FOREIGN PATENT DOCUMENTS

CN 106405719 A 2/2017
CN 106526861 A 3/2017
(Continued)

OTHER PUBLICATIONS

Search Report and Written Opinion for International Application No. PCT/CN2018/104498 dated Nov. 28, 2018.
(Continued)

*Primary Examiner* — Sultan Chowdhury
(74) *Attorney, Agent, or Firm* — Calfee, Halter & Griswold LLP

(57) ABSTRACT

The present disclosure relates to augmented reality glasses, including: a transparent display device for displaying an image; a polarizing element configured to convert external light incident to the transparent display device into polarized light in the first direction of the external light, which polarized light transmits through the transparent display device; a light-splitting element configured to transmit
(Continued)

polarized light in the first direction of light for displaying the image and polarized light in the first direction of the external light, and reflect polarized light in the second direction of the light for displaying the image; and a light-reflecting structure configured to receive the polarized light in the second direction reflected by the light-splitting element and totally reflect it into a viewing angle range of eyes of a user wearing the augmented reality glasses. The glasses will not block the line of sight on the side of the user.

20 Claims, 2 Drawing Sheets

(58) Field of Classification Search
CPC .......... G02B 27/283; G02B 2027/0112; G02B 2027/0134; G02B 2027/0138; G02B 2027/0174; G02B 2027/0178; G02B 2027/0187
See application file for complete search history.

(56) References Cited

U.S. PATENT DOCUMENTS

| | | | | |
|---|---|---|---|---|
| 9,915,823 B1* | 3/2018 | Kress | ................. | G02B 5/04 |
| 2012/0242865 A1* | 9/2012 | Vartanian | ................ | H04N 5/272 |
| | | | | 348/239 |
| 2013/0070338 A1 | 3/2013 | Gupta et al. | | |
| 2016/0187654 A1* | 6/2016 | Border | ................. | G02B 5/18 |
| | | | | 359/567 |
| 2016/0274360 A1* | 9/2016 | Inagaki | .............. | G02B 27/0176 |
| 2017/0293143 A1* | 10/2017 | Martinez | ............ | G02B 27/0176 |
| 2017/0329402 A1 | 11/2017 | Riedel | | |
| 2019/0129168 A1 | 5/2019 | Tan | | |
| 2019/0146221 A1* | 5/2019 | Oku | .................... | G02B 6/0026 |
| | | | | 359/13 |

FOREIGN PATENT DOCUMENTS

| | | |
|---|---|---|
| CN | 106842571 A | 6/2017 |
| CN | 107329256 A | 11/2017 |
| CN | 107422484 A | 12/2017 |
| CN | 107966821 A | 4/2018 |
| CN | 108614360 A | 10/2018 |

OTHER PUBLICATIONS

First Office Action for Chinese Patent Application No. 201810619928.6 dated Jul. 1, 2019.

\* cited by examiner

AUGMENTED REALITY GLASSES

RELATED APPLICATIONS

The present application is the U.S. national phase entry of PCT/CN2018/104498, with an international filling date of Sep. 7, 2018, which claims priority to the Chinese patent application No. 201810001591.2 filed on Jan. 2, 2018 and the Chinese patent application No. 201810619928.6 filed on Jun. 14, 2018, the entire disclosures of which are incorporated herein by reference.

FIELD

The present disclosure relates to the field of display, particularly to augmented reality glasses.

BACKGROUND

Augmented Reality (AR) technology, also known as mixed reality technology, applies virtual information to a real-world environment through image processing, and may merge a physical object(s) in the real-world environment and the virtual information into a same picture or space. This may increase the dimensions of object(s) observed by users and give the users a sensory experience beyond reality.

However, since augmented reality glasses require the addition of some added components for the virtual information presentation, a user wearing such glasses often feels that his line of sight is blocked (for example, on the side where these components are mounted) by these components, thereby affecting the user's experience.

SUMMARY

According to a first embodiment of the present disclosure, augmented reality glasses are provided, comprising: a transparent display device, a polarizing element, a light-splitting element and a light-reflecting structure. The transparent display device is configured for displaying an image. The polarizing element is disposed on a side of the transparent display device that is opposite to an image-displaying side and configured to convert external light incident to the transparent display device into polarized light in the first direction of the external light. The polarized light in the first direction of the external light transmits through the transparent display device. The light-splitting element is disposed at a first preset angle from the image-displaying side of the transparent display device and configured to transmit polarized light in the first direction of light emitted by the transparent display device for displaying the image and the polarized light in the first direction of the external light, and reflect polarized light in a second direction of the light emitted by the transparent display device for displaying the image. The light-reflecting structure is configured to receive the polarized light in the second direction reflected by the light-splitting element and totally reflect it into a viewing angle range of eyes of a user wearing the augmented reality glasses.

Optionally, the first preset angle is set according to a desired reflection angle for the polarized light in the second direction.

Optionally, the light-reflecting structure comprises one or more reflective surfaces for receiving the polarized light in the second direction reflected by the light-splitting element and totally reflecting it into the viewing angle range of eyes of the user.

Optionally, the light-reflecting structure comprises a first reflective surface and a second reflective surface. The first reflective surface is disposed in parallel with and opposite to the light-splitting element and is configured to receive the polarized light in the second direction reflected by the light-splitting element and totally reflect it to the second reflective surface. The second reflective surface is disposed at a second preset angle from the first reflective surface and configured to receive the polarized light in the second direction reflected by the first reflective surface and totally reflect it into the viewing angle range of eyes of the user.

Optionally, the augmented reality glasses further comprise a glasses frame. The transparent display device, the polarizing element, the light-splitting element, and the first reflective surface are disposed on a lateral side of the glasses frame, and the second reflective surface is disposed on a front side of the glasses frame.

Optionally, the light-reflecting structure is further configured to transmit external light incident from the front of the augmented reality glasses.

Optionally, the transparent display device is an organic light-emitting diode display device.

Optionally, the augmented reality glasses further comprise lenses. The light-reflecting structure reflects an image displayed by the transparent display device to an area where the lenses are disposed.

Optionally, the augmented reality glasses further comprise a glasses frame. The transparent display device is disposed on a lateral side of the glasses frame.

Optionally, the light-splitting element is a polarization light splitter.

Optionally, the light-reflecting structure is made of a glass material.

Optionally, the first reflective surface and the second reflective surface are integrally disposed.

Optionally, polarization directions of the polarized light in the first direction and the polarized light in the second direction are perpendicular.

It should be appreciated that the above general description and the following detailed description are only exemplary and illustrative and would not limit the present disclosure.

BRIEF DESCRIPTION OF DRAWINGS

In order to achieve the foregoing and related purposes, the following description and the drawings illustrate certain illustrative embodiments and implementations. These only indicate that several ways of various ways in which one or more embodiments may be employed. When considered with reference to the drawings, other embodiments, advantages, and novel features of the present disclosure will become apparent from the following detailed description.

DETAILED DESCRIPTION

Figure 1:
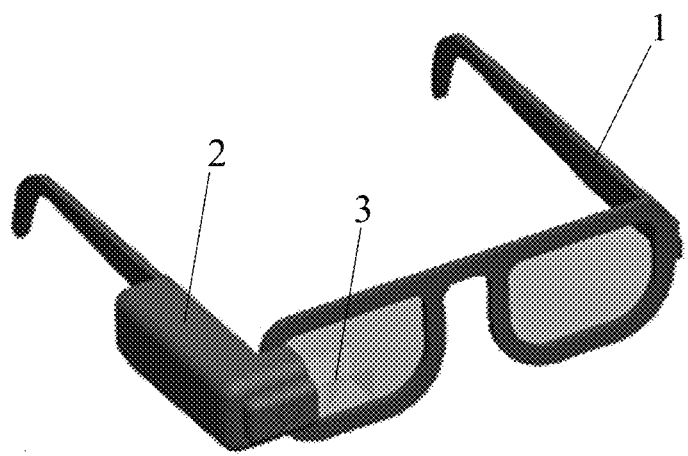
FIG. 1 is a schematic structural diagram of augmented reality glasses provided by related art.

In the following description, for purposes of illustration other than limitation, some specific details such as members, elements and structures of the disclosed embodiments are stated to enable clear and thorough understanding of the present disclosure. However, those skilled in the art should easily appreciate that the present disclosure may be implemented according to other embodiments that do not precisely conform to details described herein, without seriously departing from the spirit and scope of the present disclosure. In addition, in this context, for the sake of brevity, detailed descriptions of well-known devices are omitted to avoid redundant details and possible confusion.

The area that may be observed by human eyes is limited and varies from person to person. In general, only a central portion of an image projected onto a retina of a human eye can be distinguished clearly. A distinguishing viewing angle of the human eye is within a range of about 15 degrees in the horizontal direction of the human eye. The range between 15 degree and 30 degree in the horizontal direction of the human eye is called an effective viewing angle range. Within the effective viewing angle range, the human eye can see the presence and actions of an object immediately. But the person needs to turn his head to distinguish clearly, and the distinguishing capability is already reduced. The left and right portions beyond 30 degree in the horizontal direction of the human eye, particularly the portions in a range between 30 degree and 100 degree in the horizontal direction of the human eye, are called induced viewing angle range, which is commonly called the peripheral vision of the eyes. Within the induced viewing angle range, it is only possible to feel presence of an object(s) or occurrence of an action(s), but it is impossible to see clearly what the object or action is. When people feel that there is a moving object, or something changes, they will turn their eyeballs or heads and necks, and let the object fall into their distinguishing viewing angles. The induced viewing angle varies widely among different people.

The visual field may be divided into three categories according to the working states of the eyeballs: static visual field, gazing visual field and dynamic visual field. The static visual field refers to a range that can be naturally seen by the human eyes in a state where the head is fixed and the eyeballs are stationary. The gazing visual field is a range that can be seen by the human eyes when the head is fixed and the eyeballs are turned to gaze at a certain center point. The dynamic visual field is a range that can be seen by the human eyes when the head is fixed and the eyeballs are turned freely. In these three kinds of visual fields, the gazing visual field has a minimum range and the dynamic visual field has a maximum range. Generally, relevant components such as the visual display are designed based on the static visual field to reduce the fatigue of the human eyes.

FIG. 1 shows a schematic structural diagram of augmented reality glasses provided by related art. As shown in FIG. 1, the augmented reality glasses include a glasses frame 1, a display device 2 disposed on a lateral side of the glasses frame, and an optical waveguide element 3. The display device 2 is used to display an image representing virtual information. The optical waveguide element 3 is used to project an image displayed by the display device 2 in front of the human eyes. The image is merged with a physical object(s) in the real-world environment seen by the human eye to achieve an augmented reality effect. Since the display device 2 and the optical waveguide element 3 block the passage of light, a user wearing the augmented reality glasses may feel that the line of sight on the side is blocked, and thus the user's experience is degraded.

Figure 2:
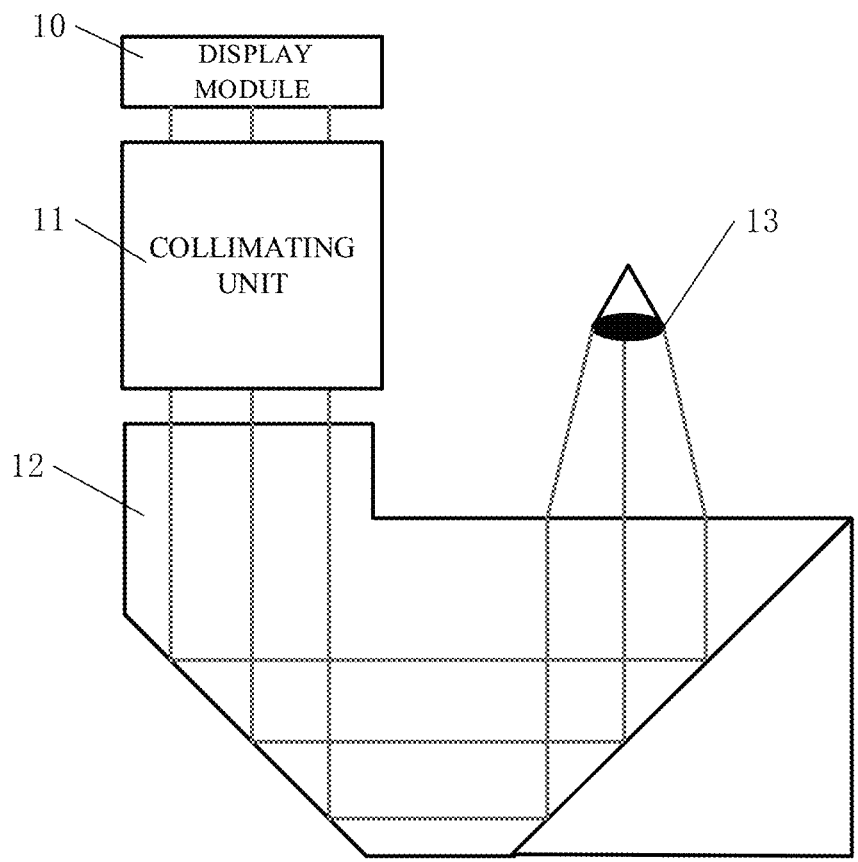
FIG. 2 is a schematic diagram of optical paths of augmented reality glasses provided by the related art.

FIG. 2 shows a schematic diagram of optical paths of augmented reality glasses provided by the related art. The augmented reality glasses (hereinafter referred to as glasses) include a display device 10, a collimating unit 11, and a light guiding structure 12. The collimating unit 11 and the light guiding structure 12 may also be referred to as an optical waveguide element. As shown in FIG. 2, the display device 10 is used to display an image. The image displayed by the display device 10 passes through the collimating unit 11 and then enters the light guiding structure 12, and the image is reflected by the light guiding structure 12 to the front of the user's eyes 13. The image is merged with physical objects in the real-world environment observed by the user's eyes to achieve an augmented reality effect. Here, when the external light is incident on the display device 10 and the collimating unit 11 on the side of the user's eyes, they also block the passage of light and thereby obstructs the line of sight of the user in the lateral direction.

In the augmented reality glasses provided by the related art, the display device is usually disposed at a part of the glasses on the side of the user's eyes in order to ensure effect of user's observation of things in front of him. In this way, the display device may block the line of sight of user's eyes in the lateral direction, affecting the effect of user's observation of things on the side of him, and thereby affecting the user's experience in use.

Figure 3:
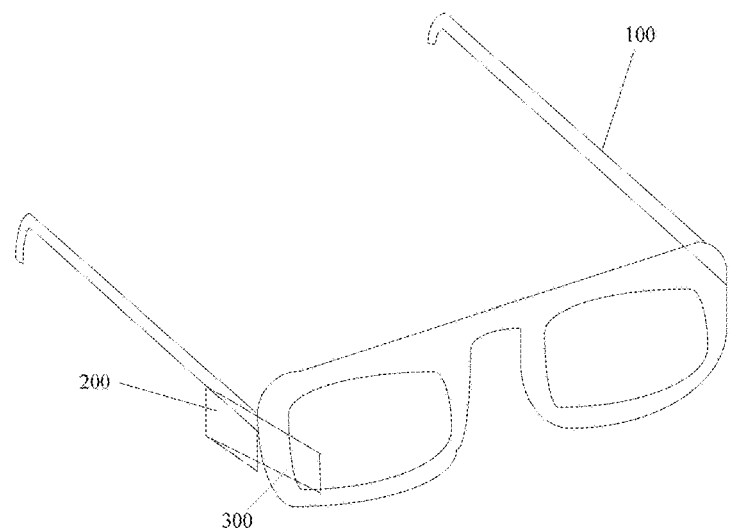
FIG. 3 is a schematic diagram of augmented reality glasses according to an embodiment of the present disclosure.

FIG. 3 shows a schematic diagram of augmented reality glasses in accordance with an embodiment of the present disclosure. As shown in FIG. 3, the glasses include: a transparent display device 200 and a light guiding member 300.

The transparent display device 200 is used to display an image.

In some embodiments, the transparent display device is a transparent display that is capable of displaying an image and capable of transmitting light incident from the outside. The transparent display is similar to a piece of transparent glass when it is turned off. While it is working, the viewer can not only view the image displayed on the transparent display, but also view the object(s) behind the display through the display simultaneously.

For the technology for implementing transparent display, for example, an original opaque portion of the device may be replaced with a material with high transparency or be removed, in order to improve the overall transparency of the device to achieve transparent display.

In some embodiments, the transparent display device may be a display device that displays an image using natural light. The display device may have no polarizing element, and the natural light used to display an image is unpolarized light. The transparent display device is for example an Organic Light-Emitting Diode (OLED) display device.

The light guiding member 300 may not only transmit external light, but also guide the natural light emitted by the transparent display device for the displayed image in order to present the image within the visual field of eyes of a user wearing the glasses. In this way, the user can not only see the physical object(s) in the real-world environment, but also can see the image displayed by the transparent display device. The image may be merged with the physical objects in the real-world environment seen by the human eye to achieve the augmented reality effect.

Optionally, the glasses may include a glasses frame 100. In some embodiments, the transparent display device 200 and the light guiding member 300 can be collectively disposed on the side of the glasses frame 100 or any other suitable position.

According to an embodiment of the present disclosure, since the transparent display device is transparent, the display device will not block the user's line of sight (especially the line of sight in the lateral direction) after it is disposed on the glasses (for example, disposed on the side or other position of the glasses frame), i.e. it generally does not affect the effective viewing angle and induced viewing angle of the human eye as described above. Moreover, since the light guiding member can also transmit light, therefore, it will not block the line of sight of user's eyes (the effective viewing angle of eyes) in front even when being disposed on the glasses. Therefore, the user, after wearing the augmented reality glasses, may experience the augmented reality effect, without suffering from reduced viewing angle for observing the surrounding environment due to the line of sight being blocked. This improves the user's security in using the augmented reality glasses. In particular, when the user uses the glasses outdoors, the glasses do not affect the user in observing the road conditions in the lateral direction, and the safety is greatly improved.

Figure 4:
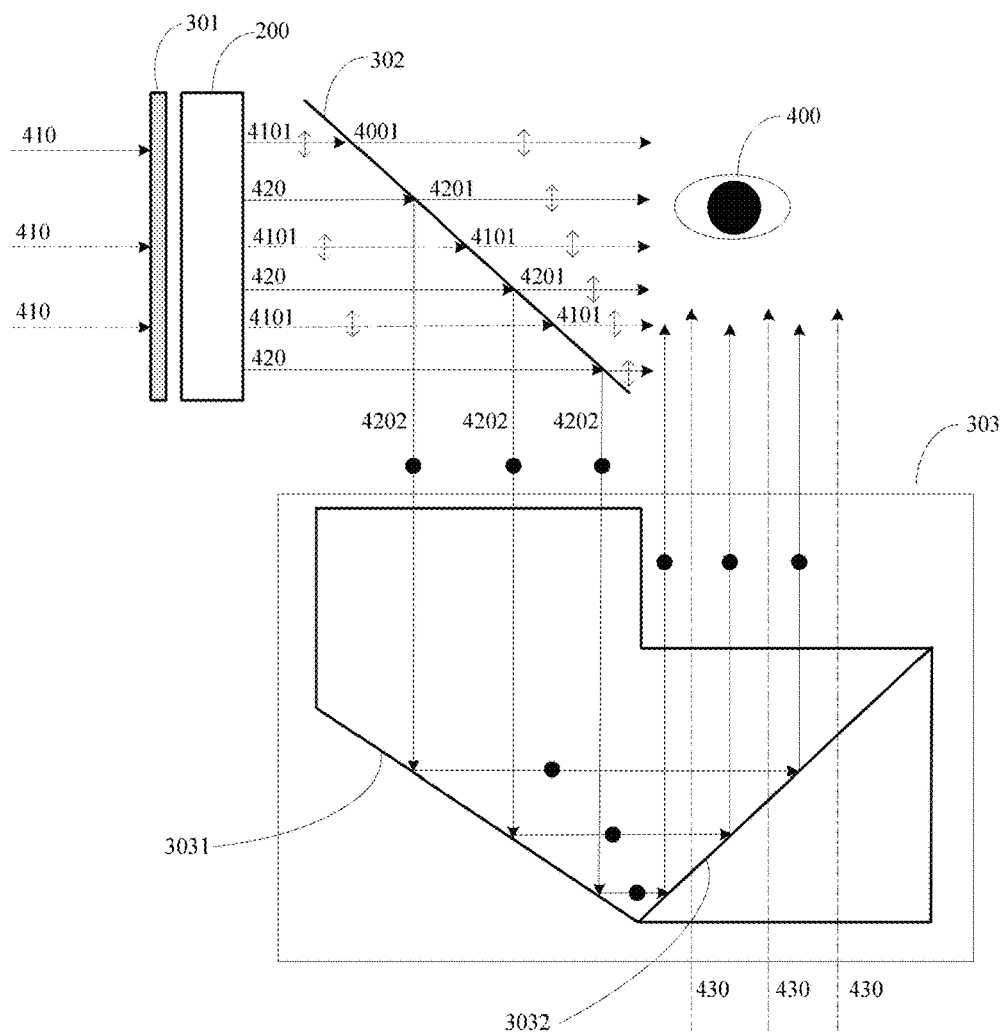
FIG. 4 is a schematic structural diagram of augmented reality glasses according to an embodiment of the present disclosure.

FIG. 4 schematically illustrates the structure of augmented reality glasses according to an embodiment of the present disclosure. As shown in FIG. 4, the augmented reality glasses include a transparent display device 200 and a light guiding member. The transparent display device 200 includes an image-displaying side and a side opposite to the image-displaying side.

The light guiding member may include a polarizing element 301, a light-splitting element 302, and a light-reflecting structure 303.

The polarizing element 301 is disposed on the side of the transparent display device 200 opposite to the image-displaying side, for converting external light incident to the transparent display device 200 into polarized light in the first direction of the external light. When the image-displaying side of the transparent display device 200 is referred to as a front side, and the side opposite to the image-displaying side is referred to as a back side, it may be said that the polarizing element 301 is disposed on the back side of the transparent display device 200. The external light incident from the back side of the transparent display device 200 passes through the polarizing element 301 and then becomes the polarized light in the first direction. The polarized light in the first direction of the external light continues to transmit through the transparent display device 200.

The light-splitting element 302 is disposed at a first preset angle from the image-displaying side of the transparent display device 200 and used to transmit polarized light in the first direction of light that is emitted by the transparent display device 200 for displaying the image and transmit the polarized light in the first direction of the external light that already passes through the transparent display device 200, and reflect polarized light in the second direction of the light that is emitted by the transparent display device 200 for displaying the image to the light-reflecting structure 303.

The light-reflecting structure 303 is configured to receive the polarized light in the second direction reflected by the light-splitting element 302 and totally reflect it into a viewing angle range of eyes of a user wearing the augmented reality glasses.

It may be appreciated that the external light and the light emitted by the transparent display device 200 for displaying the image are both natural light, which are unpolarized light. The polarizing element is an optical element for converting natural light into polarized light. The polarizing element has a certain characteristic direction called polarization direction. The polarizing element only allows light whose vibration direction is parallel to its polarization direction to pass while filtering out light that vibrates perpendicular to the direction. The vibration direction of the light passing through a polarizer is limited to a certain vibration direction, so the natural light, after passing through the polarizing element, is converted into light having a certain vibration direction. In one embodiment, the polarization directions of the polarized light in the first direction and the polarized light in the second direction are perpendicular.

If a coordinate system is established and a plane where the polarizing element lies is the plane where the coordinate system lies, the light whose polarization direction is parallel to the plane is called p-polarized light, and the light whose polarization direction is perpendicular to the plane is called s-polarized light.

In some embodiments, the polarizing element 301 for example may be a polarizer that transmits the p-polarized light or a polarizer that transmits the s-polarized light. Light transmitted through the polarizing element 301 herein is referred to as polarized light in the first direction. Exemplarily, the polarized light in the first direction may be one of p-polarized light and s-polarized light. Accordingly, the polarized light in the second direction may be the other of p-polarized light and s-polarized light.

In FIG. 4, the externally incident light 410 (for example, external light incident from the side of the glasses in FIG. 3) is natural light, namely, unpolarized light. Light 410 passes through polarizing element 301 and then is converted into polarized light in the first direction 4101 (the polarized light in the first direction may be for example the p-polarized light). The polarized light in the first direction 4101, after being incident on the transparent display device 200, transmits through the transparent display device 200 and continues to travel.

The light-splitting element 302 is disposed at a first preset angle from the image-displaying side (namely, the front side) of the transparent display device 200. The first preset angle may be set as required (e.g., to a desired angle of incidence or at a desired angle of reflection of the light), for example, it may be set to 45°. The light-splitting element may split the incident light beam into multiple beams. In some embodiments, the light-splitting element 302 may split the incident beam into, for example, two beams according to polarization. The light-splitting element 302 may be arranged to transmit the polarized light in the first direction and reflect the polarized light in the second direction. In one example, the first preset angle may be set according to a desired angle of reflection of the polarized light in the second direction to reflect the polarized light in the second direction to a position of the light-reflecting structure.

In FIG. 4, the polarized light in the first direction 4201 (which may be for example the p-polarized light) in the natural light 420 emitted by the transparent display device 200 for displaying the image is transmitted through the light-splitting element 302. The polarized light in the first direction 4101 in the natural light 410 incident from the outside is also transmitted through the light-splitting element 302 after passing through the transparent display device 200. The light-splitting element 302 may also reflect the polarized light in the second direction 4202 (which may be, for example, s-polarized light) in the natural light 420 emitted by the transparent display device 200 for displaying the image to the light-reflecting structure 303. That is, the polarized light in the second direction 4202 cannot pass through the light-splitting element 302, instead, it is reflected by the light-reflecting element 302.

The light-splitting element 302 may be a polarization light splitter, optionally a polarization light-splitting prism.

The light-reflecting structure 303 may totally reflect the received polarized light in the second direction that is reflected by the light-splitting element 302 into the viewing angle range of user's eye 400. The brightness loss of the image during reflection may be reduced with total reflection.

According to an embodiment of the present disclosure, external incident light is converted into polarized light of a first direction by the polarizing element. The polarized light in the first direction, after passing through the transparent display device, may transmit through the light-splitting element and may enter an observable area of the user's eyes. Thus, the transparent display device does not block the user's line of sight. If the transparent display device is disposed on the lateral side of the glasses, the light from the side may still enter the human eye. Since the human eye can observe objects in the lateral direction by using the peripheral vision, the safety of using the glasses may be improved. Moreover, since the polarized light in the first direction in the natural light emitted by the transparent display device for the displayed image may also enter the human eye from the lateral side, when the human eye observes the lateral side with the peripheral vision, the effect of superimposing and merging physical objects in the lateral environment with the virtual image can also be seen. This may further enhance the user's experience in use.

Further, the polarized light in the second direction in the natural light emitted by the transparent display device for the displayed image may be reflected by the light-splitting element and the light-reflecting structure into the viewing angle range of the user's eyes, so that the human eye can see the virtual image. The virtual image is superimposed and merged with the physical objects in the front real-world environment seen by the human eye, thus achieving the augmented reality effect.

In an optional embodiment, the light-reflecting structure 303 includes a first reflective surface 3031 and a second reflective surface 3032.

The first reflective surface 3031 may be disposed in parallel with and opposite to the light-splitting element 302 and configured to receive the polarized light in the second direction reflected by the light-splitting element 302 and totally reflect it to the second reflective surface 3032.

The second reflective surface 3032 may be disposed at a second preset angle from the first reflective surface 3032 and configured to receive the polarized light in the second direction reflected by the first reflective surface 3031 and totally reflect it to the viewing angle range of the user's eyes.

In this embodiment, the light-reflecting structure includes two reflective surfaces that, after twice total reflections, reflect the polarized light in the second direction in the natural light emitted by the transparent display device for displaying the image into the viewing angle range of the human eye. Setting two reflective surfaces to implement twice reflections may change the reflection direction of the image in a wider range. This facilitates to reflect the image to exactly the front of the user's eye, i.e. within the range of the distinguishing viewing angle of the human eye, enabling the user to view the image at a better viewing angle.

The second preset angle between the second reflective surface 3032 and the first reflective surface 3031 may be set as required. The angle between the two reflective surfaces may be set such that the polarized light in the second direction reflected by the first reflective surface exits after being totally reflected by the second reflective surface, and then enters into the viewing angle range of the user's eye.

It may be appreciated that the light-reflecting structure may also be other structures. For example, the light-reflecting structure may include one or several reflective surfaces, and after reflection of one time or several times, the polarized light in the second direction is totally reflected to the viewing angle range of the user's eyes.

The light-reflecting structure may be made of a glass material. Glass has good light transmittance, may improve the transmittance of the reflected image, and reduce the brightness loss of the image. The glass may be processed into a certain shape, and then may act as the light-reflecting structure with a reflective surface provided. For example, in the process of processing glass, a plane is disposed, and a reflective layer is disposed on the plane as the first reflective surface; another plane is disposed, which plane is at an angle from the first reflective surface, and a reflective layer is disposed on the plane as the second reflecting surface. Alternatively, the light-reflecting structure may be made of two pieces of glass materials, wherein one piece has the first reflective surface and the other piece has the second reflective surface.

Optionally, the first reflective surface and the second reflective surface are integrally disposed, that is, the first reflective surface and the second reflective surface are integrally disposed in one piece of material. For example, both the first reflective surface and the second reflective surface are disposed in a light-reflecting structure made of a piece of glass material. This may improve the integration of the glasses and simplify the structure of the glasses.

Furthermore, the second reflective surface is also used to transmit external light incident from the front of the augmented reality glasses.

In some embodiments, the transparent display device is disposed on the side of the augmented reality glasses. In order to better reflect the image from the transparent display device to the user's eyes, the natural light of the image displayed by the transparent display device, after being reflected by the light guiding member, may be parallelly incident into the viewing angle range of the user's eyes, and partial structure of the light guiding member might be located in front of the user's eyes. In order to prevent the light guiding member from blocking the user's line of sight, the light guiding member may also transmit external light incident from the front of the augmented reality glasses.

For example, the light guiding member includes the polarizing element 301, the light-splitting element 302, and the light reflecting structure 303. A portion of the light-reflecting structure 303 may be disposed in front of the user's eye 400. For example, the second reflective surface 3032 may be disposed on the front side of the eyeglass frame. At this time, external light 430 being incident from the front of the glasses may illuminate to the second reflective surface 3032. That portion of external light may pass through the second reflective surface 3032 and then exits and enters the viewing angle range of the user's eyes.

In some examples, lenses are disposed on the glasses frame. The light-reflecting structure (e.g., the second reflective surface 3032) may reflect an image displayed by the transparent display device to the area where the lenses are disposed.

The lenses are located at a position on the glasses frame aligned with the user's eyes. The lenses may be plane lenses or lenses that may be used to correct myopia or hyperopia.

The lenses may be disposed to meet the needs of different users (for example, myopia or hyperopia users), and thereby facilitate the user's use. Moreover, the light-reflecting structure reflects the image to the area where the lenses are located, that is, within the range of the line of sight exactly in front of the user's eyes. Presenting the image within the range of effective viewing angle of human eyes facilitates the user to observe the image, reduces the fatigue of the user's eyes upon observing the image, and helps implement a better augmented reality effect.

In addition, the material of the glasses frame may be plastic or resin. Compared with metal, a plastic or resin material is lighter and less prone to be damaged, which is not only convenient for a user to wear, but also improves the service life of the glasses.

According to an embodiment of the present disclosure, the augmented reality glasses employ a transparent display device. Since it is transparent, it will not block the line of sight of the user's eyes, so it usually does not affect the effective viewing angle and the induced viewing angle of the human eyes. Moreover, since the light guiding member may also transmit light, placing it on the glasses will not block the user's line of sight (especially, for example, the line of sight within the effective viewing angle of the human eyes), either. Therefore, the user wearing the augmented reality glasses may experience the augmented reality effect, and his line of sight will not be blocked. This improves the user's security in use.

Although the present disclosure has been shown and described with respect to one or more implementations, other implementations of the present disclosure can be readily envisaged by those skilled in the art based on reading and understanding of the description and drawings. The present disclosure is intended to cover any equivalent variations, uses and adaptations, and is limited only by the scope of the following claims. In particular, with respect to the various functions performed by the components (e.g., elements, structures, etc.) described above, unless otherwise indicated, the terms used to describe such components are intended to correspond to any components that perform the specified functions (e.g., functionally equivalent functions) of the described components, even if they are not structurally equivalent to the disclosed structures. The disclosed structures perform the functions in the exemplary implementations illustrated in the text of the present disclosure herein. Moreover, although specific features of the present disclosure might be disclosed in connection with only one of several implementations, such features may be combined with one or more other features of other implementations in a way that may be desirable or advantageous for any given or particular application.

It should be appreciated that the present disclosure is not limited to the precise structures already described above and illustrated in the figures, and various modifications and variations may be performed without departing from its scope. The scope of the present disclosure is to be limited only by the appended claims.

The invention claimed is:

1. Augmented reality glasses, comprising:
a transparent display device for displaying an image;
a polarizing element disposed on a side of the transparent display device that is opposite to an image-displaying side of the transparent display device and configured to convert external light incident to the transparent display device into polarized light in a first direction of the external light, the polarized light in the first direction of the external light transmitting through the transparent display device;
a light-splitting element disposed at a first preset angle from the image-displaying side of the transparent display device and configured to transmit polarized light in a first direction of light emitted by the transparent display device for displaying the image and the polarized light in the first direction of the external light, and reflect polarized light in a second direction of the light emitted by the transparent display device for displaying the image; and
a light-reflecting structure configured to receive the polarized light in the second direction reflected by the light-splitting element and totally reflect it into a viewing angle range of eyes of a user wearing the augmented reality glasses.

2. The augmented reality glasses according to claim 1, wherein the first preset angle is set according to a desired reflection angle for the polarized light in the second direction.

3. The augmented reality glasses according to claim 1, wherein the light-reflecting structure comprises one or more reflective surfaces for receiving the polarized light in the second direction reflected by the light-splitting element and totally reflecting it into the viewing angle range of eyes of the user.

4. The augmented reality glasses according to claim 1, wherein the light-reflecting structure comprises a first reflective surface and a second reflective surface,
the first reflective surface is disposed in parallel with and opposite to the light-splitting element and is configured to receive the polarized light in the second direction reflected by the light-splitting element and totally reflect it to the second reflective surface; and
the second reflective surface is disposed at a second preset angle from the first reflective surface and configured to receive the polarized light in the second direction reflected by the first reflective surface and totally reflect it into the viewing angle range of eyes of the user.

5. The augmented reality glasses according to claim 4, further comprising: a glasses frame, wherein the transparent display device, the polarizing element, the light-splitting element and the first reflective surface are disposed on a lateral side of the glasses frame, and wherein the second reflective surface is disposed on a front side of the glasses frame.

6. The augmented reality glasses according to claim 1, wherein the light-reflecting structure is further configured to transmit external light incident from the front of the augmented reality glasses.

7. The augmented reality glasses according to claim 1, wherein the transparent display device is an organic light-emitting diode display device.

8. The augmented reality glasses according to claim 1, further comprising lenses,
wherein the light-reflecting structure reflects an image displayed by the transparent display device to an area where the lenses are disposed.

9. The augmented reality glasses according to claim 1, further comprising:
a glasses frame, wherein the transparent display device is disposed on a lateral side of the glasses frame.

10. The augmented reality glasses according to claim 1, wherein the light-splitting element is a polarization light splitter.

11. The augmented reality glasses according to claim 1, wherein the light-reflecting structure is made of a glass material.

12. The augmented reality glasses according to claim 4, wherein the first reflective surface and the second reflective surface are integrally disposed.

13. The augmented reality glasses according to claim 1, wherein polarization directions of the polarized light in the first direction and the polarized light in the second direction are perpendicular.

14. The augmented reality glasses according to claim 2, wherein the light-reflecting structure comprises one or more reflective surfaces for receiving the polarized light in the second direction reflected by the light-splitting element and totally reflecting it into the viewing angle range of eyes of the user.

15. The augmented reality glasses according to claim 2, wherein the light-reflecting structure comprises a first reflective surface and a second reflective surface,
the first reflective surface is disposed in parallel with and opposite to the light-splitting element and is configured to receive the polarized light in the second direction reflected by the light-splitting element and totally reflect it to the second reflective surface; and
the second reflective surface is disposed at a second preset angle from the first reflective surface and configured to receive the polarized light in the second direction reflected by the first reflective surface and totally reflect it into the viewing angle range of eyes of the user.

16. The augmented reality glasses according to claim 2, wherein the transparent display device is an organic light-emitting diode display device.

17. The augmented reality glasses according to claim 2, further comprising lenses,
wherein the light-reflecting structure reflects an image displayed by the transparent display device to an area where the lenses are disposed.

18. The augmented reality glasses according to claim 2, further comprising:
a glasses frame, wherein the transparent display device is disposed on a lateral side of the glasses frame.

19. The augmented reality glasses according to claim 2, wherein the light-splitting element is a polarization light splitter.

20. The augmented reality glasses according to claim 2, wherein the light-reflecting structure is made of a glass material.

* * * * *